United States Patent
Zhou et al.

(10) Patent No.: US 12,346,149 B2
(45) Date of Patent: Jul. 1, 2025

(54) CLOCK SYNCHRONIZATION IN TIME-INTERLEAVED ANALOG-TO-DIGITAL CONVERSION

(71) Applicant: HEWLETT PACKARD ENTERPRISE DEVELOPMENT LP, Spring, TX (US)

(72) Inventors: Dacheng Zhou, Fort Collins, CO (US); Peter Tsugio Kurahashi, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 18/161,927

(22) Filed: Jan. 31, 2023

(65) Prior Publication Data
US 2024/0255983 A1  Aug. 1, 2024

(51) Int. Cl.
  *G06F 1/12* (2006.01)
  *G06F 1/04* (2006.01)
  *G06F 1/08* (2006.01)

(52) U.S. Cl.
  CPC . *G06F 1/12* (2013.01); *G06F 1/08* (2013.01)

(58) Field of Classification Search
  CPC .............. G06F 1/12; G06F 1/08; G06F 1/04
  See application file for complete search history.

(56) References Cited

U.S. PATENT DOCUMENTS

| | | | |
|---|---|---|---|
| 8,035,435 B1* | 10/2011 | Shringarpure | H03K 5/15026 327/158 |
| 8,698,525 B2 | 4/2014 | Velayuthan | |
| 9,793,910 B1* | 10/2017 | Devarajan | H03M 1/124 |
| 10,250,375 B2 | 4/2019 | Black et al. | |
| 10,720,936 B1* | 7/2020 | Xu | H03M 1/121 |
| 11,044,137 B1* | 6/2021 | Azadet | H04B 1/0475 |
| 11,082,051 B2 | 8/2021 | Allan | |
| 11,115,040 B1* | 9/2021 | Xu | H03M 1/121 |
| 11,392,165 B2 | 7/2022 | Lele et al. | |
| 2009/0225919 A1* | 9/2009 | Weiss | H04J 3/047 375/371 |
| 2011/0133793 A1 | 6/2011 | Wheelock et al. | |
| 2022/0407523 A1* | 12/2022 | O'Brien | G11C 29/56016 |

* cited by examiner

*Primary Examiner* — Jaweed A Abbaszadeh
*Assistant Examiner* — Gayathri Sampath
(74) *Attorney, Agent, or Firm* — Fletcher Yoder, P.C.

(57) ABSTRACT

A TI-ADC circuit and method therefor include the use of first and second level clock generators configured to receive an asynchronous reference clock signal and generate a plurality of first and second clock signals, the second level clock generator including a plurality of clock dividers connected in series, respective ones of the plurality of clock dividers being configured to divide an input clock signal in accordance with a synchronization signal; a plurality of T/H circuits respectively configured to operate in accordance with one of the first clock signals; a plurality of sub-ADCs respectively configured to operate in accordance with one of the second clock signals, thereby to sample an input signal in a time-interleaved manner, wherein for a given clock divider of the plurality of clock dividers, the synchronization signal corresponds to an output clock of a clock divider immediately upstream from the given clock divider.

20 Claims, 6 Drawing Sheets

CLOCK SYNCHRONIZATION IN TIME-INTERLEAVED ANALOG-TO-DIGITAL CONVERSION

INTRODUCTION

Some data transmission applications, including but not limited to optical communications, require analog-to-digital conversion at very high sample rates. To achieve such sample rates, multiple analog-to-digital converter (ADC) circuits may be implemented in a time-interleaved manner. Such a time-interleaved ADC (TI-ADC) generally includes a plurality of parallel ADCs which sample an input signal in succession. Because the ADCs are interleaved in time, the overall TI-ADC has a sample rate that is significantly higher than the sample rate of any individual ADC within the TI-ADC, thus resulting in an increase in the rate at which the input signal may be converted from the analog domain into the digital domain.

BRIEF DESCRIPTION OF THE DRAWINGS

These and other more detailed and specific features of various example implementations are more fully disclosed in the following description, reference being had to the accompanying drawings, in which.

Figure 1:
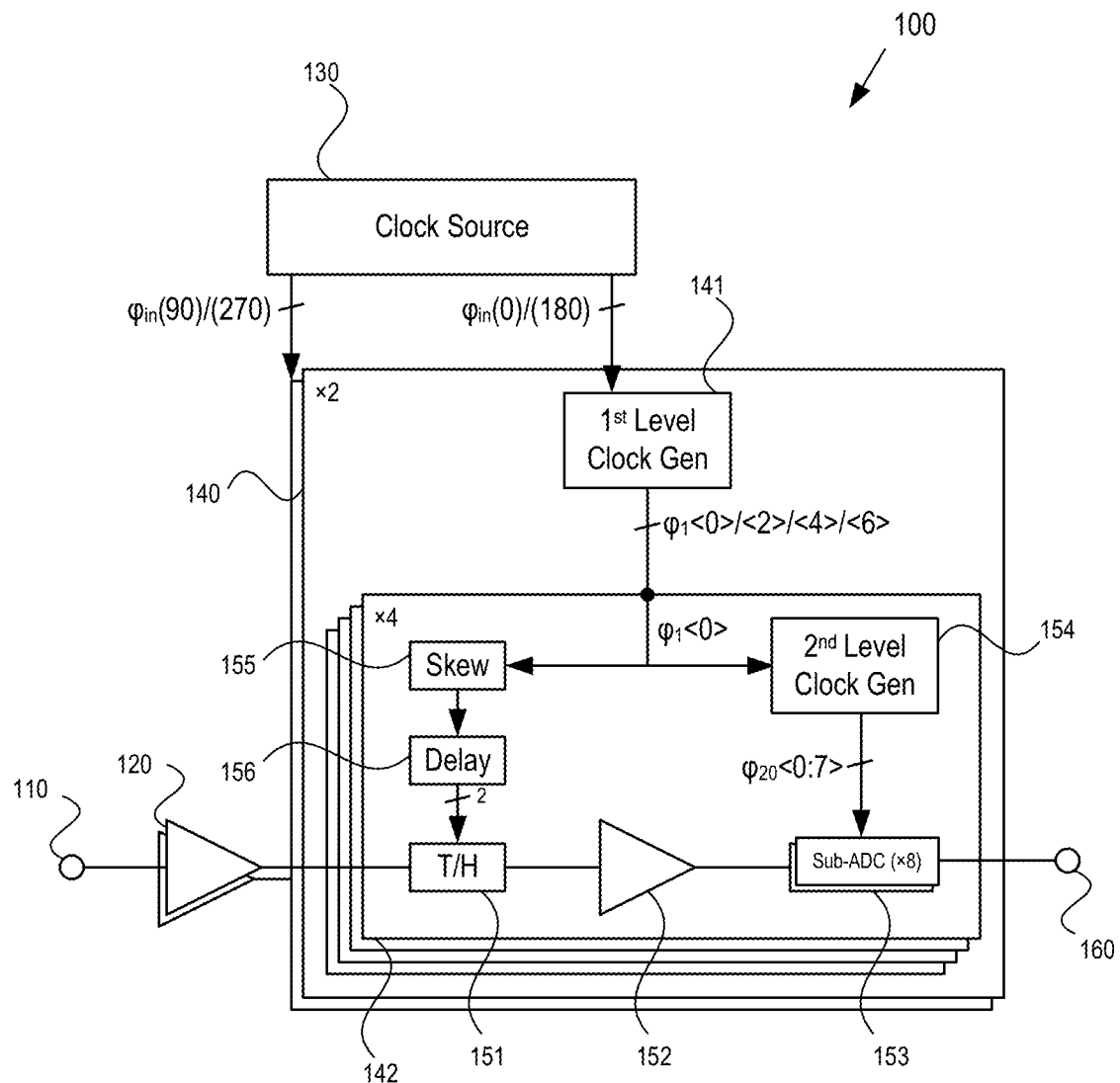
FIG. 1 illustrates an example TI-ADC in accordance with various aspects of the present disclosure.

The drawings are included to provide a further understanding of the present disclosure and are incorporated in and constitute a part of this specification. The drawings illustrate one or more examples of the present teachings and together with the description explain certain principles and operations.

DETAILED DESCRIPTION

In the following description, numerous details are set forth, such as flowcharts, schematics, and system configurations. It will be readily apparent to one skilled in the art that these specific details are merely examples and not intended to limit the scope of this application. In addition to the particular systems, devices, and methods described herein, the operations described herein may be implemented as computer-readable instructions or methods, and/or a processing node or nodes for executing the instructions or methods. Individual devices or processing nodes may respectively include a processor included in the individual device or node and/or a processor included in any controller device or node that is coupled to the individual device or node. For context, various devices, methods, systems, processes, and circuits are described herein which illustrate certain use cases of the present disclosure. However, it will be understood that the present disclosure is not so limited, and that the devices, methods, systems, processes, and circuits described herein are capable of use in situations (e.g., types of communication) not expressly listed herein.

One example use case for various aspects of the present disclosure is that of optical communication. In such communication techniques, information may be communicated between two devices by modulating light at one device to form an optical signal and transmitting the optical signal to the other device. One form of modulation that can be used in such optical communication is known as pulse-amplitude modulation (PAM), which, in the context of optical communication, involves modulating the power (i.e., the intensity) of a light signal so as to encode data for transmission. On the receiver side, a light-receiving element (e.g., a photodiode) receives the light signal and converts the light signal into an analog electrical signal. Then, ADC/decoding circuitry converts the analog electrical signal into digital signals and decodes the data therefrom. Optical communication such as PAM may be capable of achieving very high data rates and thus the transmitter and/or receiver should have a sufficiently high sample rate to properly process the received data (e.g., to convert the analog data to a digital form). In optical communication, such a sufficiently high sample rate may be on the order of tens or even hundreds of giga samples per second (GS/s).

As noted above, TI-ADCs may be used to provide a sample rate that is significantly higher than the sample rate of any individual ADC within the ADC, thus increasing the rate at which the input signal may be converted into the digital domain. In some implementations, an input of the TI-ADC may be routed into one or more main paths, each of which contain a number of sub-paths, also referred to as "slices" or "slicers." Within each slice, certain circuit elements operate in coordination with one another to track and hold an incoming signal and route it to one of a plurality of sub-ADCs, which respectively convert their analog inputs into digital outputs. Within each slice, multiple stages of clock signals may be provided. Moreover, different slices may operate according to clock signals having different phases. By this operation, each slice samples the input at its appropriate time and performs its conversion in the appropriate order.

To generate these multi-phase, multi-stage clocks, some implementations may use multiple clock dividers disposed in parallel. However, because the various components of the TI-ADC should operate with the correct ordering in time, all of the clock dividers are to be synchronized, and synchronized with a very low probability of failure. The clock synchronization process starts with an asynchronous control signal, which is then synchronized into the local clock domain by latching through a series of flip-flops (e.g., a series of serially-connected pairs of latches). A flip-flop receives a clock input and a data input, and may latch the value of the data input at a time corresponding to an edge of the clock input. In order to ensure that the flip-flop properly registers the data input, the value of the data input should enter and remain at a stable value for some amount of time prior to the clock edge, referred to as a setup time, and for some amount of time after the arrival of the clock edge, referred to as a hold time. If the value of the data input is not stable (i.e., changes) during the setup time and/or the hold time, the flip-flop may enter a metastable state and experience a type of error referred to as a metastability error. After entering the metastable state, the flip-flop will remain in said state for some probabilistic amount of time before the metastability "settles out," with an exponentially-decreasing likelihood. After the metastability settles out, the flip-flop returns to normal operation. Because the control signal is asynchronous, there is some non-zero chance that a metastability error will occur on any given latching operation. The expected time to a 50% probability of a metastability error 150 may be estimated according to the following equation:

$$t_{50} = \frac{\ln(2)}{t_w f_i f_e} e^{\frac{t_r}{\tau_r}}$$

Above, $t_w$ corresponds to the setup time plus the hold time, $f_i$ corresponds to the internal clock domain frequency (i.e., the sampling rate of the flip-flop), $f_e$ corresponds to the input event frequency (i.e., the frequency of transitions in the input data signal), $t_r$ corresponds to the resolving time (i.e., the amount of time allotted for the metastability to settle out), and $\tau_r$ corresponds to the closed-loop resolving time constant (i.e., the amount of time for an imbalance in the resolving nodes to grow by e). As can be seen from the above equation, the time to a 50% probability of failure $t_{50}$ is proportional to $\exp(t_r/\tau_r)$, meaning that lower values of $\tau_r$ and/or higher values of $t_r$ result in higher values of $t_{50}$, (i.e., a higher mean time between failures). The parameter $\tau_r$ is an inherent characteristic of the flip-flop; however, it may be difficult or impossible to produce flip-flops having a value of $\tau_r$ that meets the low probability-of-failure requirements. On the other hand, because $t_r$ may depend on the frequency of the synchronization clock, it may be possible to increase the value of $t_{50}$ and thus meet the probability-of-failure requirements by appropriately controlling the multi-phase clock generator to produce a higher value of $t_r$ (i.e., to allot more time for metastability to settle out).

The present disclosure provides circuits, devices, and methods for generating a multi-phase clock with a reduced probability of metastability errors. For example, the present disclosure describes a multi-phase clock generator including a plurality of clock dividers. Respective ones of the plurality of clock dividers are synchronized according to an output clock of other ones of the plurality of clock dividers. Because the respective output clocks of the clock dividers have a lower frequency than the respective input clocks of the clock dividers, more time is allotted for metastability in flip-flops of the clock dividers to settle out in comparison with comparative clock generators in which the clock dividers are synchronized according to an input clock thereof, which results in a higher value of $t_r$ and thus a higher value of $t_{50}$ (i.e., a longer time until a 50% probability of failure). By increasing the amount of time expected between failures, failures will be less likely to occur. The present disclosure further describes a multi-phase clock generator in which synchronicity of internal signals within the clock dividers is ensured, for example by providing an output of one of the latches to an input of a multiplexer of the same clock divider. The operation and effects of the clock dividers and their role within the multi-phase clock generators are described in more detail below with regard to the drawings.

FIG. 1 illustrates an example of a TI-ADC 100 in which the multi-phase clock generator exhibits a reduced probability of metastability errors in accordance with the present disclosure. The TI-ADC 100 of FIG. 1 may be implemented in any circuit in which high-rate analog-to-digital conversion is desired, including but not limited to optical communication (e.g., in an optical receiver), gigabit ethernet, precision measurement instruments, wireless communication systems (e.g., multi-input multi-output (MIMO) communication devices), and the like. In example implementations where the TI-ADC 100 is used as a component of a receiver circuit, additional components such as a signal-receiving element (e.g. a photodiode) and one or more input buffers may be provided upstream from the TI-ADC 100. However, in some implementations the input buffers may be included in the TI-ADC 100. The TI-ADC 100 shown in FIG. 1 receives an analog input signal at an input node 110 and generates a digital output signal at an output node 160, the digital signal corresponding to a digitized version of the input node 110. In some implementations (e.g., where the TI-ADC 100 is used as part of an optical receiver), the input node 110 may include an optical front-end configured to receive an optical signal and convert the optical signal to a voltage signal, which is then supplied to the TI-ADC 100 for conversion to the digital domain.

As illustrated, the TI-ADC 100 includes two input buffers 120, each which provides a portion of the input signal to a slice set 140 which includes a first level clock generator 141 and four slices 142, and a clock source 130 which provides four phases of an input clock $\varphi_{in}$ to the slice sets 140, with phases (0) and (180) being provided to one slice set 140 (referred to as the "even slice set 140" because it receives the zero bit and the even bits of the first input clock $\varphi_{in}$) and phases (90) and (270) being provided to the other slice set 140 (referred to as the "odd slice set 140" because it receives the odd bits of the first input clock $\varphi_{in}$). Thus, the even slice set 140 operates at a 90° phase offset from the odd slice set 140, which is referred to as one unit interval (UI). For convenience and clarity of explanation, only the even slice set 140 is shown in detail; however, it will be understood that the odd slice set 140 will be similarly arranged. The first level clock generator 141 provides a first level clock signal $\varphi_1$ to the slices 142. As shown in FIG. 1, the topmost slice 142 in the even slice set 140 (also referred to as the "topmost even slice") receives first level clock signal $\varphi_1<0>$ from the first level clock generator 141. The even slice 142 directly under the topmost even slice 142 receives first level clock signal $\varphi_1<2>$ from the first level clock generator 141, and so on. Each slice 142 includes a track-and-hold (T/H) circuit 151, a switching buffer 152, eight sub-ADCs 153, a second level clock generator 154 which receives the first level clock signal $\varphi_1$ and generates eight second level clock signals $\varphi_{2i}<0:7>$ (i being an index identifying the slice) for the sub-ADCs 153, a skew control circuit 155 which receives the first level clock signal $\varphi_1$ and adjusts a skew thereof, and a delay matching circuit 156 which provides a differential signal to the T/H circuit 151. Together, the skew control circuit 155 and delay matching circuit 156 compensate for factors such as manufacturing tolerances in the various clock source and generator circuits, path length differences, jitter, and so on.

The particular arrangement and numbers of components shown in FIG. 1 are illustrative and not limiting, and in some implementations additional or fewer slices 142 may be provided and/or the slices 142 may be differently grouped. Moreover, in some implementations the slices 142 may include a different number of T/H circuits 151 and/or sub-ADCs 153. In general, the total number of the sub-ADCs 153 may be any integer multiple of the number of T/H circuits 151. In some embodiments, each slice 142 has a similar configuration as the other slices 142 (e.g., a same number and arrangement of TH circuits 151, a same number and arrangement of sub-ADCs 151, etc.), but in other embodiments one or more slices 142 may be differently configured than one or more other slices 142 (e.g., having a different number and/or arrangement of TH circuits 151, a different number and/or arrangement of sub-ADCs 153, etc.). While not illustrated in FIG. 1, in some implementations the outputs of the plurality of sub-ADCs 153 may be connected to a component configured to order the output signals, such as a multiplexer. However, in other implementations the output node 160 may include a number of output connections (e.g., a separate output for each sub-ADC 153).

The first level clock generator 141 is configured to output the plurality of first clock signals $\varphi_1$ to the plurality of T/H circuits 151 in a one-to-one manner, and thus the number of first clock signals $\varphi_1$ may be equal to the total number of T/H circuits 151 present in the TI-ADC 100 (in the illustrated example, 4×2=8 first clock signals $\varphi_1$). In some implementations, the clock generator 141 may further be configured to output the plurality of first clock signals $\varphi_1$ (or delayed versions of the plurality of first clock signals $\varphi_1$) to the plurality of switching buffers 152 in a one-to-one manner. Each first clock signal $\varphi_1$ may be different from one another but may have the same first frequency. In some examples, the first clock signals $\varphi_1$ are phase shifted from one another such that each first clock signal $\varphi_1$ is phase shifted by a first predetermined amount δ from a next closest (in terms of phase) first clock signal $\varphi_1$, where δ corresponds to an amount of time referred to herein as one unit interval (UI). In other words, an $n^{th}$ first clock signal $\varphi_1$<n> may be separated from the $n-1^{th}$ clock signal $\varphi_1$<n-1> by the first phase shift amount δ (e.g., one UI), and the $n^{th}$ first clock signal $\varphi_1$<n> may be separated from the $0^{th}$ first clock signal $\varphi_1$<0> by n·δ (e.g., n·UI). Within each slice 142, the second level clock generator 154 is configured to output the plurality of second clock signals $\varphi_{2i}$ to the plurality of sub-ADCs 153 in a one-to-one manner, and thus the number of second clock signals $\varphi_{2i}$ may be equal to the total number of sub-ADCs 153 present in one slice 142 of the TI-ADC 100. Each second clock signal $\varphi_{2i}$ may be different from one another but may have the same second frequency. In some examples, the second clock signals $\varphi_{2i}$ be phase shifted from one another by a second predetermined phase shift amount, which differs from the first predetermined phase shift amount. The first frequency, corresponding to the first clock signals $\varphi_1$, may be larger than the second frequency, corresponding to the second clock signals $\varphi_{2i}$, and may be an integer multiple of the second frequency. In some examples, the integer may be equal to the number of sub-ADCs 153 for a given T/H circuit 152 (e.g., the number of sub-ADCs 153 per slice 142), which in the illustrated example of FIG. 1 is eight.

The T/H circuits 151 are respectively configured to operate in accordance with the corresponding first clock signal $\varphi_1$, such that they temporarily store the value of the input signal at the appropriate time. Thus, in some examples the first clock signals $\varphi_1$ may be distributed among the T/H circuits 151 such that a pair of adjacent T/H circuits 151 (i.e., for adjacent slices 140) receives a pair of the first clock signals $\varphi_1$ separated from one another by a phase difference equal to the predetermined phase difference amount δ, which in some implementations may be two unit intervals (UIs) to reduce the likelihood of overlap. The switching buffers 152 are configured to receive the output of a T/H circuit 151 and route the output to the appropriate sub-ADC 153 at the appropriate time. The sub-ADCs 153 are respectively configured to operate in accordance with the corresponding second clock signal $\varphi_2$, such that they sample the input signal (i.e., the output of the switching buffers 152 which correspond to the input signal to the TI-ADC 100 at the input node 110) in a time-interleaved manner and convert the sampled signal into the digital domain.

Figure 2:
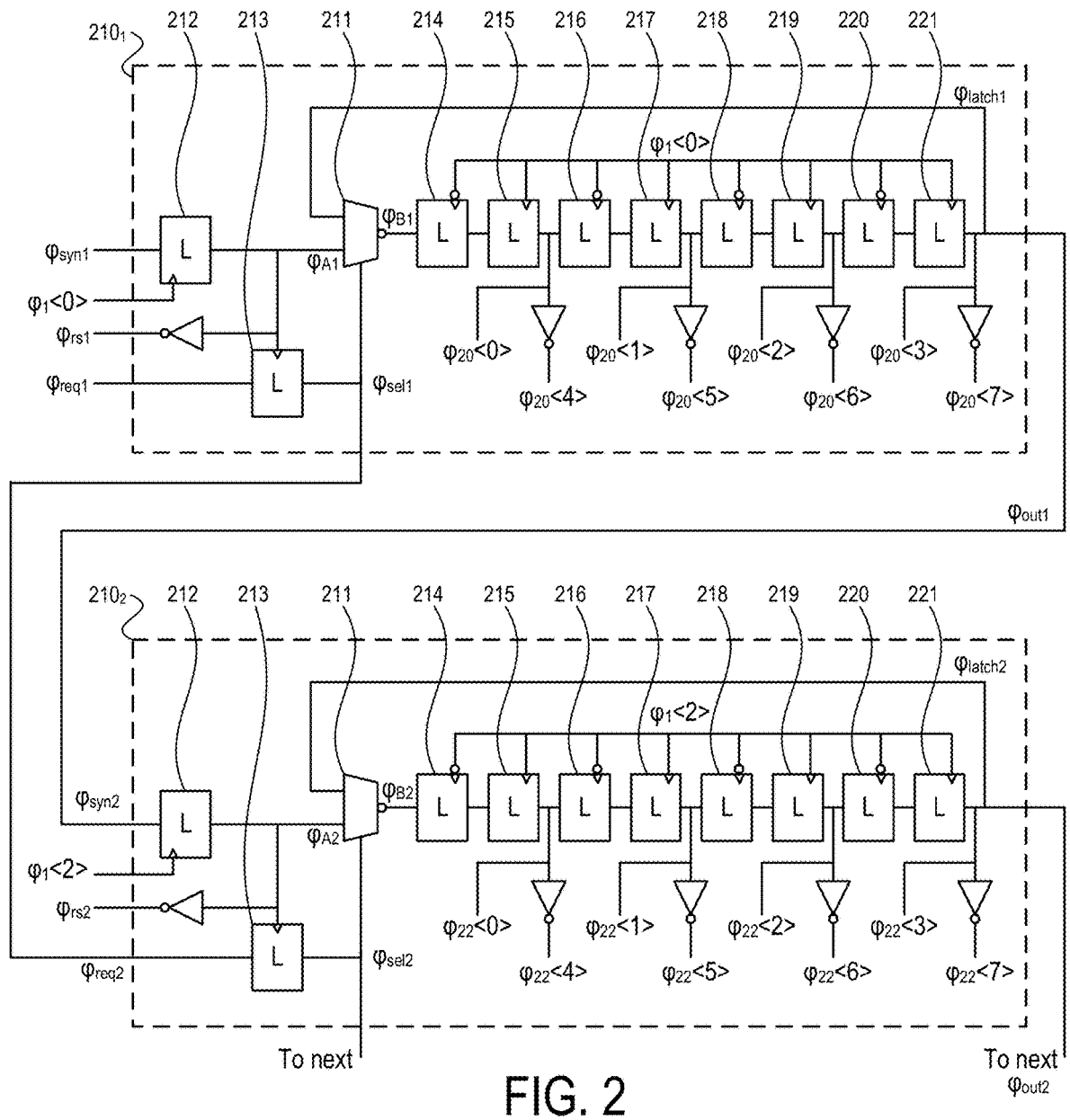
FIG. 2 illustrates a clock generator in accordance with various aspects of the present disclosure.

FIG. 2 illustrates an example clock generator in accordance with the present disclosure, which may be one example of a portion of the plurality of second level clock generators 154, the topmost of which of which is illustrated in FIG. 1. The clock generator of FIG. 2 includes N≥2 clock dividers 210 (one per slice 142, in some examples), in which each clock divider 210 may correspond to one second level clock generator 154). Although only two clock dividers 210 (e.g., $210_1$ and $210_2$) are illustrated in FIG. 2 for convenience, in practical implementations more clock dividers 210 may be present depending on the total number of clock signals which may be generated. For example, in the TI-ADC 100 of FIG. 1, the clock divider $210_1$ may correspond to the second level clock generator 154 of the topmost slice 142 in the even slice set 140 (i.e., the second level clock generator 154 which receives first clock signal $\varphi_1$<0>), the clock divider $210_2$ may correspond to the second level clock generator 154 of the adjacent slice 142 in the even slice set 140 (i.e., the second level clock generator 154 which receives first clock signal $\varphi_1$<2>), and additional clock dividers 210 (not illustrated) similar in configuration to the clock divider $210_2$ may correspond to the second level clock generators 154 of the other slices 142 in the even slice set 140. Each of the clock dividers 210 are configured to divide an input clock signal $\varphi_1$ in accordance with a synchronization signal $\varphi_{syn}$. The clock dividers 210 are connected in series, such that, for a given clock divider 210, the synchronization signal $\varphi_{syn}$ of one clock divider 210 corresponds to one of the output clocks $\varphi_{out}$ of the clock divider 210 immediately upstream from the given clock divider 210, other than for first clock divider 210. In other words, $\varphi_{syn\_n}=\varphi_{out\_n-1}$, where $\varphi_{syn\_n}$ is the synchronization signal input to the $n^{th}$ clock divider $210\_n$ and $\varphi_{out\_n-1}$ is the clock output signal $\varphi_{out}$ output by the $(n-1)^{th}$ clock divider $210\_(n-1)$. This is expressly shown in FIG. 2 for one pair of clock dividers 210, in which $\varphi_{out1}$ (the output signal from the clock divider $210_1$)=$\varphi_{syn2}$ (the synchronization signal input to the clock divider $210_2$). The first (topmost) clock divider 210 may be free-running, such that the external synchronization signal $\varphi_{syn1}$ and the external synchronization request signal $\varphi_{req1}$ are able to be set to and held at a high level (i.e., logical 1).

In the illustrated example, the clock divider 210 includes a two-to-one multiplexer 211 and a plurality of latches 212-221. Each latch 212-221 receives an input signal and temporarily stores ("latches") a value of the input signal in accordance with an edge of a clock signal, and outputs the stored value as an output signal. On the next corresponding edge of the clock signal, each latch 212-221 latches the new value of the input signal and thus the output signal changes to match the newly-stored value. The latch 212 receives the synchronization signal $\varphi_{syn}$ and the input clock $\varphi_1$, and outputs a signal to an input of the multiplexer 211. The latch 213 receives a synchronization request signal $\varphi_{req1}$ and an output of the latch 212, and outputs a signal $\varphi_{sel}$ to a selection input of the multiplexer 211. The latches 214-221 are connected in series such that an output of one latch is an input of the next latch. Each of the latches 314-221 receives the first clock signal $\varphi_1$<0>, and every second latch of the latches 214-221 outputs a pair second clock signals $\varphi_2$ to a corresponding pair of the sub-ADCs. For example, in the clock divider $210_1$, the latch 214 receives the first clock signal $\varphi_1$<0>, the latch 215 receives the first clock signal $\varphi_1$<0> and outputs second clock signal $\varphi_{20}$<0> and its inverted counterpart $\varphi_{20}$<4>, the latch 216 receives the first clock signal $\varphi_1$<0>, the latch 317 receives the first clock signal $\varphi_1$<0> and outputs the second clock signal $\varphi_{20}$<1> and its inverted counterpart $\varphi_{20}<5>$, and so on. Similarly, in the clock divider $210_2$, the latch 214 receives the first clock signal $\varphi_1<2>$, the latch 215 receives the first clock signal $\varphi_1<2>$ and outputs second clock signal $\varphi_{22}<0>$ and its inverted counterpart $\varphi_{22}<4>$, and so on. Thus, each clock divider receives one first clock signal $\varphi_1$ and outputs eight second clock signals $\varphi_2$.

Figure 3:
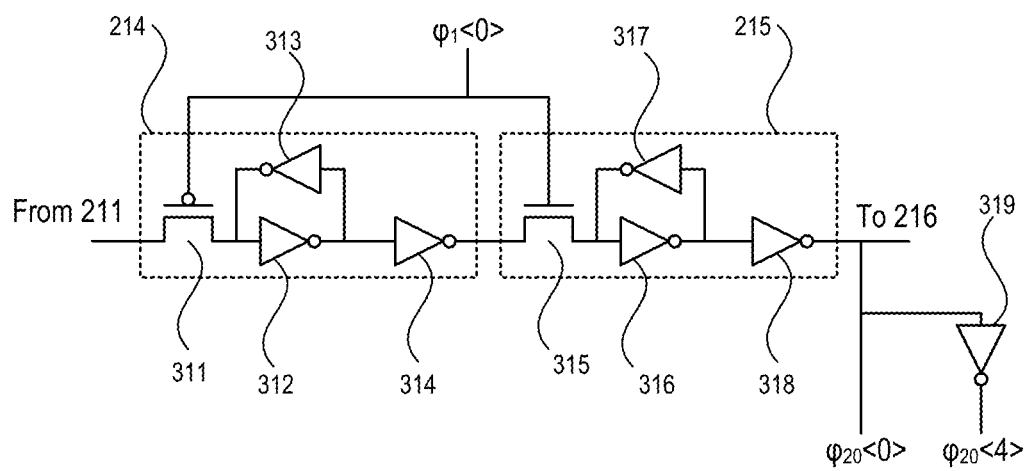
FIG. 3 illustrates latches in accordance with various aspects of the present disclosure.

Alternating latches have alternating conductivity types; for example, latch 214 is p-type, latch 215 is n-type, latch 216 is p-type, and so on. By alternating the conductivity types, it is possible to avoid the use of additional inverters. This is illustrated in FIG. 3, which shows latches 214 and 215 in detail. It should be understood that latches 216 and 217, latches 218 and 219, and latches 220 and 221 are similarly structured. The latch 214, being p-type, includes a p-type field effect transistor (FET) 311 and inverters 312, 313, and 314. The latch 215, being n-type, includes a N-type FET 315 and inverters 316, 317, and 318. The latch 214 and the latch 215 receive first clock signal $\varphi_1<0>$. The output of the multiplexer 211 (see FIG. 2) is input to the latch 214, and the output of the latch 215 is input to the latch 216 (see FIG. 2). Second clock signal $\varphi_{20}<0>$ and second clock signal $\varphi_{20}<4>$ are output from the latch 215 to the corresponding sub-ADCs 153 (see FIG. 1), with second clock signal $\varphi_{20}<4>$ first passing through an inverter 319.

Returning to FIG. 2, an output signal of the last latch 221 is used as a latching signal $\varphi_{latch}$ and provided to an input of the multiplexer 211, thereby to latch the input. This ensures that a clock edge in the output $\varphi_{A1}$ of the latch 212 arrives at the multiplexer 211 later than a clock edge in the latching signal $\varphi_{latch}$, for example based on the periodic nature of the signals involved. In other words, the operation of the latches 214-221 imparts a total phase delay of slightly less than an integer multiple $2\pi$. This, together with the output of the latch 212 arriving at the multiplexer 211 earlier than the output of the latch 213 (acting as the selection signal for the multiplexer 211), ensures accurate operation of the multiplexer 211. In other words, this timing ensures that there are no transitions in the output of the multiplexer 211 while the multiplexer 211 is switching. For example, consider the multiplexer 211 of the clock divider $210_1$. The multiplexer 211 transitions between two states depending on the value of its inputs $\varphi_{A1}$ and $\varphi_{latch1}$ and of the selection signal $\varphi_{sel1}$. In the first state, $\varphi_{syn1}$ is fed into the latch 212 and $\varphi_{req1}$ is at logical 0. In this state, because $\varphi_{req1}$ is low, the multiplexer 211 will select $\varphi_{A1}$. Thus, during the first state the output $\varphi_{B1}$ of the multiplexer 211 (and thus the output of downstream latches) is driven based on $\varphi_{syn1}$. Because the output $\varphi_{out1}$ of the clock divider $210_1$ is provided to the input of the clock divider $210_2$ as $\varphi_{syn2}$, $\varphi_{syn2}$ is also indirectly based on $\varphi_{syn1}$. Subsequently, $\varphi_{req1}$ transfers from logical 0 to logical 1, after which point the multiplexer 211 in the clock divider $210_1$ will select $\varphi_{latch1}$ instead of $\varphi_{A1}$. In this second state, the multiplexer 211 is self-latched, meaning its output is looped back as its input instead of relying on an external synchronization signal. The multiplexers 211 present in downstream clock dividers 210 (such as in clock divider $210_2$) go through a similar transition, and thus will become self-latched as well.

Although not illustrated in FIG. 2, the clock divider 210 may further include delay elements (e.g., series-connected inverters) just prior to the output such that a delay exists between the latching signal $\varphi_{latch}$ and the output clock $\varphi_{out}$. As shown in FIG. 2, the output of the latch 212 is also inverted to generate the resynchronization signal $\varphi_{rs}$, which is used to synchronize the synchronization signal $\varphi_{syn}$.

As noted above, because the clock dividers 210 are connected in series, the output clock $\varphi_{out}$ is also used as the synchronization signal $\varphi_{syn}$ input to the next clock divider 210, connected immediately downstream. Because the output clock $\varphi_{out}$ has a lower frequency than the synchronization signal $\varphi_{sync}$, there is more time between successive clock edges in the output clock $\varphi_{out}$. Thus, the resolving time ($t_r$ in the equation discussed above) of the latches (forming flip-flops when paired) in the next clock divider 210 is increased because there is more time for any metastability to settle out before the arrival of the next clock edge. This may result in an expected time to 50% probability of metastability error that is reduced by multiple orders of magnitude, in comparison to comparative implementations in which the output clock $\varphi_{out}$ is not provided to the downstream clock divider 210. Moreover, this increase in the expected time to failure may be accomplished without the difficulties present in attempting to provide flip-flops with reduced closed-loop resolving time constants.

As illustrated in FIG. 2, the output of the latch 213 (corresponding to the selection signal of the multiplexer 211) in one clock divider 210 is provided to the input of the latch 213 in the next clock divider 210, thus ensuring that the next clock divider 210 operates at the correct timing relative to the previous clock divider 210. To ensure the correct relative timing, delay elements (e.g., a pair of inverters connected in series) may be disposed along the signal path, such that $\varphi_{req2}$ corresponds to a delayed version of $\varphi_{sel1}$. While FIG. 2 illustrates two such clock dividers 210, in practical implementations any number of clock dividers 210 may be connected in a daisy-chain configuration. For example, in the TI-ADC 100 illustrated in FIG. 1, four clock dividers 210 may be connected in a first daisy-chain (corresponding to the second level clock generators 154 in the even slice set 140) and four clock dividers 210 may be connected in a second daisy-chain (corresponding to the second level clock generators 154 in the odd slice set 140).

Figure 4:
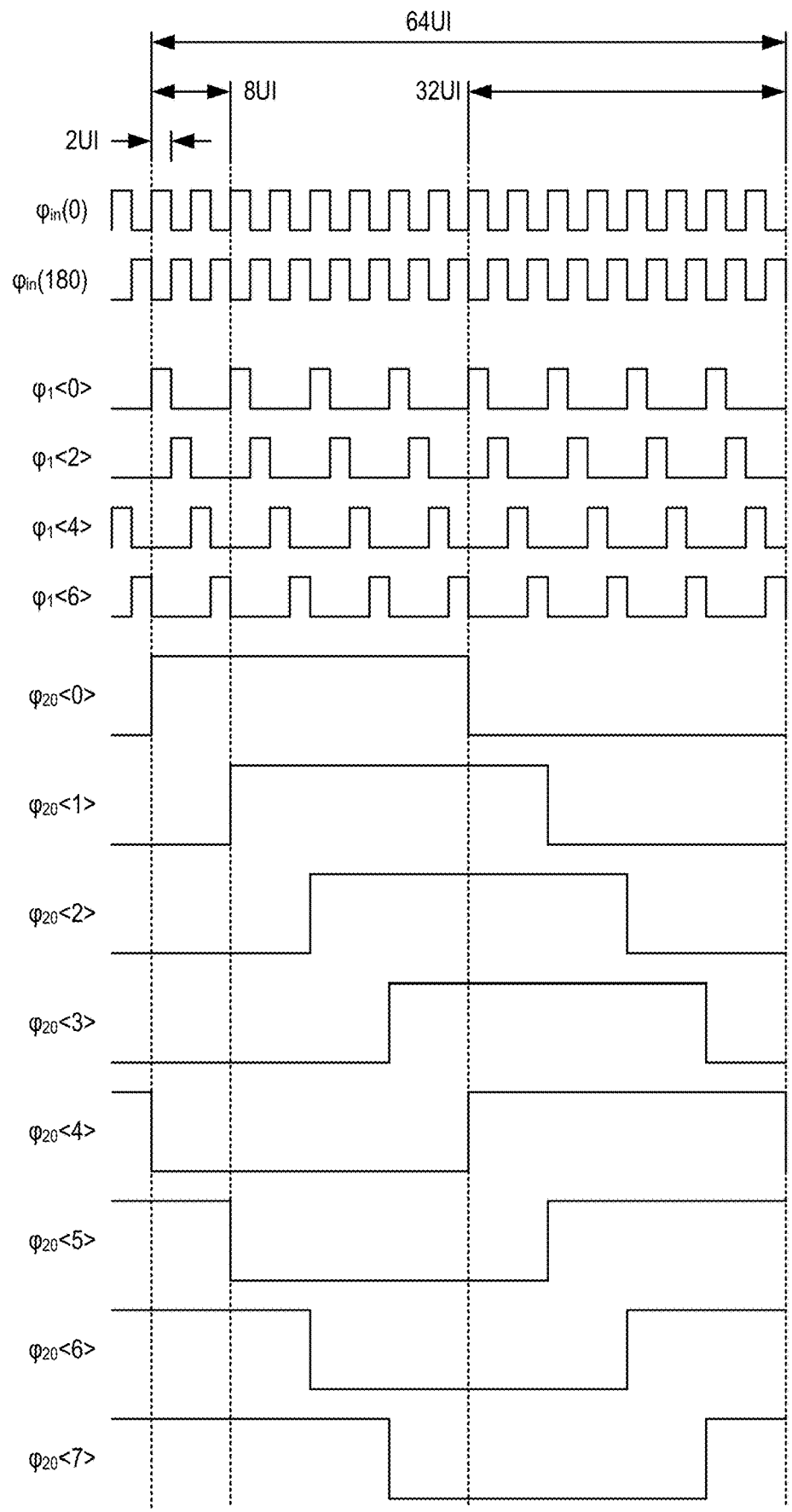
FIG. 4 illustrates an example timing diagram for clock signals in accordance with various aspects of the present disclosure.

FIG. 4 illustrates an example timing diagram for a subset of clock signals output from the first level clock generators 141 and the second level clock generators 154 of FIG. 1, for example when the second level clock generators have the structure illustrated as clock divider 210 of FIG. 2. In particular, FIG. 4 illustrates respective waveforms for two of the input clocks $\varphi_{in}$ generated by the clock source 130 (having phase 0 and phase 180), for the four first clock signals $\varphi_1$ generated by the first level clock generator 141 in the even slice set 140, and for the plurality of second clock signals $\varphi_2$ generated by the second level clock generator 154 in the topmost slice 142 of the even slice set 142. As described above, a larger number of clock signals are present in practical implementations, although these additional clock signals are omitted from the illustration of FIG. 4 for clarity purposes. For example, in the TI-ADC 100 illustrated in FIG. 1, four input clock signals $\varphi_{in}$, eight first clock signals $\varphi_1$, and sixty-four second clock signals $\varphi_2$ are present.

In FIG. 4, each of the input clock signals $\varphi_{in}$ are high for two UIs and low for two UIs, such that they have a duty cycle of 50%. Each of the first clock signals $\varphi_1$ are high for two UIs and low for six UIs, such that they have a duty cycle of 25%. The first clock signals $\varphi_1$ have the same frequency (equal to one-half of the frequency of the input clock signals $\varphi_{in}$) but are separated from one another by a phase difference of two UIs. Thus, the first clock signals $\varphi_1$ illustrated in FIG. 4 may correspond to the first clock signals $\varphi_1$ supplied to the T/H circuits 151 in the slices 142 in the even slice set 140 in the illustration of FIG. 1. It will be understood that example waveforms for the first clock signals $\varphi_1$ supplied to the slices 142 in the odd slice set 140 (which may be referred to as $\varphi_1<1>$, $\varphi_1<3>$, $\varphi_1<5>$, and $\varphi_1<7>$, respectively, may be separated from the waveforms $\varphi_1<0>$, $\varphi_1<2>$, $\varphi_1<4>$, and $\varphi_1<6>$, respectively, shown in FIG. 4 by a phase difference of one UI. Each of the second clock signals $\varphi_2$ are high for thirty-two UIs and low for thirty-two UIs, such that they have a duty cycle of 50%. The second clock signals $\varphi_2$ have the same frequency but are separated from one another by a phase difference of eight UIs, and the frequency of the second clock signals $\varphi_2$ is one-eighth the frequency of the first clock signals $\varphi_1$. Thus, the second clock signals $\varphi_2$ may correspond to the second clock signals $\varphi_2$ supplied to the sub-ADCs 133 in the slices 130 along the top path in the illustration of FIG. 1. The duration of a UI will depend on the sampling rate of the TI-ADC. In one particular example, the frequency of the input clock om may be equal to approximately 13.28 GHZ, the frequency of each first clock signal $\varphi_1$ may be equal to approximately 6.64 GHz, and the frequency of each second clock signal $\varphi_2$ may be equal to approximately 830 MHz. In this example, one UI may be equal to approximately 17.8 picoseconds (ps). In this implementation, each first clock signal $\varphi_1$ has a pulse duration of approximately 35.7 ps and each second clock signal $\varphi_2$ has a pulse duration of approximately 570 ps.

Figure 5:
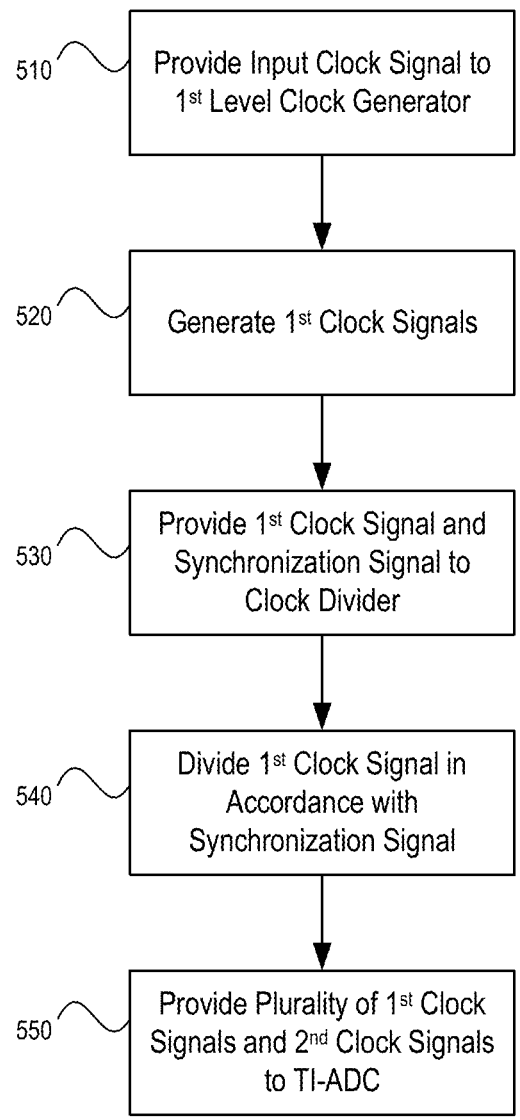
FIG. 5 illustrates an example process flow for clock generation in accordance with various aspects of the present disclosure.

A clock generator in accordance with the present disclosure (e.g., the second level clock generator 154 illustrated in FIG. 1) may be operated according to a process flow to ensure precise time control with a reduced probability of metastability failure. One example of such a process flow is illustrated in FIG. 5. For purposes of illustration and explanation, the operations of FIG. 5 will be described as being performed by a control node (e.g., a processor) within the TI-ADC itself; however, the present disclosure is not so limited. In some implementations, the operations of FIG. 5 may instead be performed by an external control node. The process flow begins at operation 510, in which the control node provides an input clock signal to a first level clock generator. For example, the control node may cause the clock source 130 to begin transmitting the input clock signal $\varphi_m$ to the first level clock generator 141. Next, at operation 520 the first level clock generator generates a plurality of first clock signals, which may correspond to the first clock signals $\varphi_1$ described above with regard to FIGS. 1-4. Operation 520 may include dividing the input clock signal to generate the plurality of first clock signals. Thereafter, at operation 530, the first level clock generator provides the plurality of first clock signals to a second level clock generator, which may correspond to the second level clock generators 154 illustrated in FIG. 1, formed by a chain of clock dividers 210 illustrated in FIG. 2. Next, the second level clock generator generates a plurality of second clock signals.

Generating the plurality of second clock signals may include providing, to respective ones of the plurality of clock dividers in the clock generator, one of the plurality of first clock signals and a synchronization signal. As described above with regard to FIG. 2, the synchronization signal for a given clock divider corresponds to an output clock of a clock divider immediately upstream from the given clock divider. Generating the plurality of first clock signals and the plurality of second clock signals may also include operation 540 in which respective ones of the plurality of clock dividers divide their respective input clock signals in accordance with the synchronization signals. Generating the plurality of second clock signals may also include providing a latching signal such that a pulse of the latching signal arrives at a respective input of the respective clock divider before a pulse of the synchronization signal arrives at a second input of the respective clock divider. An example of this operation is illustrated in FIG. 2 and described above, in which a latch of a clock divider provides a latching signal to an input of a multiplexer of the same clock divider.

The clock signal generating operations may be performed independently by each of the plurality of clock dividers in a successive manner; for example, a clock divider may perform operation 530 to generate an output clock signal which is provided to an adjacent clock divider as the synchronization signal, and then the adjacent clock divider may perform its own instance of operation and 530 to generate its own output clock signal, and so on for each of the clock dividers in the clock generator. At operation 550, the first and second level clock generators provide the plurality of first clock signals and the plurality of second clock signals to the conversion components of the TI-ADC (e.g., to the slices 130 illustrated in FIG. 1). However, operation 550 is not necessarily a single operation performed at the end of the process flow, and may instead be continuously performed throughout the process flow. For example, concurrently with providing the first clock signals to the second level clock generator, the first level clock generator may provide the first clock signals to the TI-ADC.

The example systems and methods described herein may be performed under the control of a processing system executing computer-readable codes embodied on a non-transitory computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. In accordance with the present disclosure, a non-transitory computer-readable medium may store instructions that, when executed by an electronic processor (e.g., an electronic processor of any of the above-described devices), cause the performance of the operations described herein.

Figure 6:
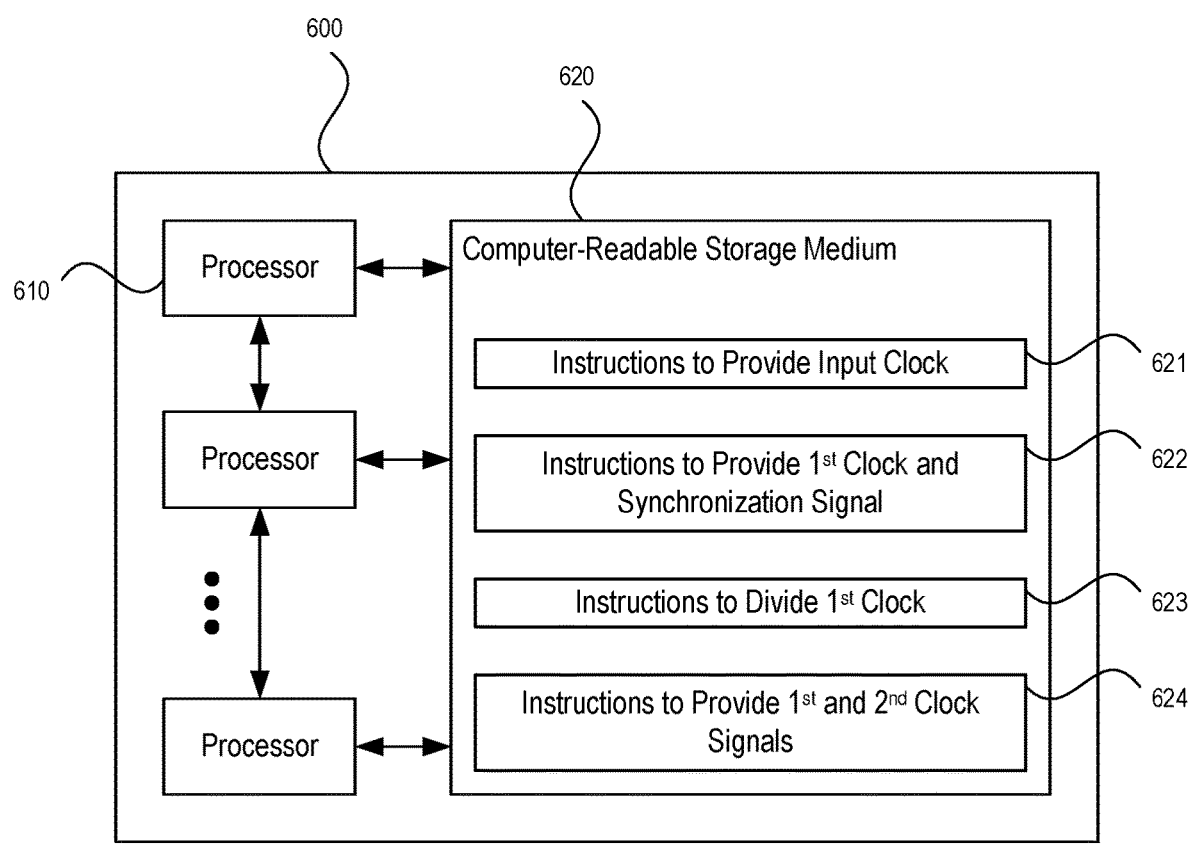
FIG. 6 illustrates an example processing system in accordance with the present disclosure.

FIG. 6 illustrates an example processing system 600 in accordance with the present disclosure. The processing system 600 may be implemented as a device configured to control the operation of any one or more of the above-described devices, including but not limited to the TI-ADC illustrated in FIG. 1 or the clock generator illustrated in FIG. 2. In some examples, the processing system 600 may be provided as a separate device, whereas in other examples the processing system 600 may be a component of one of the above-described devices (e.g., a component of the clock generator 140).

As shown in FIG. 6, the processing system 600 includes at least one processor 610 (as illustrated, three) operatively connected to a memory implemented as a computer-readable storage medium 620. The at least one processor 610 may be or include one or more electronic processing cores operatively connected to one another and configured to execute instructions stored in the computer-readable storage medium 620. Different processors 610 may be included in the same device or distributed across different devices. The computer-readable storage medium 620 may be implemented as several different media included in the same device or distributed across different devices. The computer-readable storage medium 620 may be a non-transitory computer-readable medium or distributed media storing instructions that, when executed by the at least one processor 610 or a subset thereof, cause the processing system 600 to perform various operations, such as the operations illustrated in FIG. 5 and described above.

Thus, as illustrated in FIG. 6, the instructions include instructions to provide an input clock 621 (e.g., instructions to provide an input clock signal to a first level clock generator), instructions to provide a first clock and a synchronization signal 622 (e.g., instructions to provide, to respective ones of a plurality of clock dividers of a second level clock generator, one of a plurality of first clock signals and a synchronization signal, wherein the synchronization signal for a given clock divider corresponds to an output clock of a clock divider immediately upstream from the given clock divider), instructions to divide the input clock 623 (e.g., instructions to, by respective ones of the plurality of clock dividers, divide the first clock signal in accordance with the synchronization signal), and instructions to provide first and second clock signals 624 (e.g., instructions to provide the plurality of first clock signals and a plurality of second clock signals to a TI-ADC circuit). The instructions may further include instructions to provide a latching signal such that a pulse of the latching signal arrives at a respective input of the respective clock divider before a pulse of the synchronization signal arrives at a second input of the respective clock divider.

Examples of the computer-readable storage medium 620 include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable storage medium 620 may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the disclosure, and are intended to be illustrative and not restrictive. Many example implementations and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future example implementations. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various example implementations for the purpose of streamlining the disclosure. This method of disclosure is not to be interpreted as reflecting an intention that the claimed example implementations require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A time-interleaved analog-to-digital converter (ADC) circuit, comprising:
    a first level clock generator configured to receive an input clock signal and generate a plurality of first clock signals different from one another and each having a first frequency;
    a second level clock generator configured to receive the plurality of first clock signals and to generate a plurality of second clock signals different from one another and each having a second frequency, the second level clock generator including a plurality of clock dividers connected in series, respective ones of the plurality of clock dividers being configured to divide a corresponding first clock signal in accordance with a synchronization signal;
    a plurality of track-and-hold (T/H) circuits respectively configured to operate in accordance with a first clock signal of the plurality of first clock signals; and
    a plurality of sub-ADCs respectively configured to operate in accordance with a second clock signal of the plurality of second clock signals, thereby to sample an input signal in a time-interleaved manner, wherein
    for a given clock divider of the plurality of clock dividers, the synchronization signal corresponds to an output clock of a clock divider immediately upstream from the given clock divider.

2. The circuit according to claim 1, wherein the given clock divider includes a two-to-one multiplexer and a plurality of latches.

3. The circuit according to claim 2, wherein an output of one of the plurality of latches is supplied to a first input of the multiplexer.

4. The circuit according to claim 2, wherein, for the given clock divider, a selection signal of the multiplexer is also provided as a synchronization request signal to a clock divider immediately downstream from the given clock divider.

5. The circuit according to claim 1, wherein the first frequency is an integer multiple of the second frequency.

6. The circuit according to claim 1, wherein a total number of the plurality of sub-ADCs is an integer multiple of a total number of the plurality of T/H circuits.

7. The circuit according to claim 1, wherein the respective first clock signal of a first T/H circuit of the plurality of T/H circuits is separated from the respective first clock signal of a second T/H circuit of the plurality of T/H circuits by a predetermined phase difference, the second T/H circuit being adjacent the first T/H circuit.

8. A method of clock generation, comprising:
    providing an input clock signal to a first level clock generator;
    dividing the input clock signal by the first level clock generator to generate a plurality of first clock signals;
    providing the plurality of first clock signals to a second level clock generator, the second level clock generator including a plurality of clock dividers connected in series;

generating, by the second level clock generator, a plurality of second clock signals, including:
  providing, to respective ones of the plurality of clock dividers, a synchronization signal and a first clock signal of the plurality of first clock signals, wherein the synchronization signal for a given clock divider corresponds to an output clock of a clock divider immediately upstream from the given clock divider, and
  by respective ones of the plurality of clock dividers, dividing the first clock signal in accordance with the synchronization signal; and
  providing the plurality of first clock signals and the plurality of second clock signals to a time-interleaved analog-to-digital converter (ADC) circuit.

9. The method according to claim 8, wherein the generating the plurality of second clock signals includes, for respective ones of the plurality of clock dividers:
  providing a latching signal such that a pulse of the latching signal arrives at a respective input of the respective clock divider before a pulse of the synchronization signal arrives at a second input of the respective clock divider.

10. The method according to claim 9, wherein the latching signal corresponds to an output of a latch of the respective clock divider.

11. The method according to claim 8, wherein respective ones of the plurality of first clock signals have a first frequency, and respective ones of the plurality of second clock signals have a second frequency smaller than the first frequency.

12. The method according to claim 11, wherein the first frequency is an integer multiple of the second frequency.

13. The method according to claim 8, wherein respective ones of the plurality of first clock signals are separated from one another by a predetermined phase difference.

14. A receiver, comprising:
  an input buffer configured to receive an analog input signal;
  a first level clock generator configured to receive an input clock signal and generate a plurality of first clock signals different from one another and having a first frequency; and
  a plurality of input slices, respective ones of the plurality of input slices being configured to receive an output of the input buffer and the plurality of input slices including:
    a second level clock generator configured to receive the plurality of first clock signals and generate a plurality of second clock signals different from one another and having a second frequency, the second level clock generator including a plurality of clock dividers connected in series, respective ones of the plurality of clock dividers being configured to divide a corresponding first level clock signal in accordance with a synchronization signal,
    a plurality of track-and-hold (T/H) circuits respectively configured to operate in accordance with a first clock signal of the plurality of first clock signals,
    a plurality of sub-ADCs respectively configured to operate in accordance with a second clock signal of the plurality of second clock signals, thereby to sample an output of the T/H circuit in a time-interleaved manner and to generate a digital output signal, wherein
  for a given clock divider of the plurality of clock dividers, the synchronization signal corresponds to an output clock of a clock divider immediately upstream from the given clock divider.

15. The receiver according to claim 14, wherein a given clock divider includes a plurality of latches.

16. The receiver according to claim 15, wherein an output of one of the plurality of latches is provided to an input of the given clock divider.

17. The receiver according to claim 14, wherein the first frequency is an integer multiple of the second frequency.

18. The receiver according to claim 17, wherein the integer is equal to a total number of the plurality of sub-ADCs in a given input slice.

19. The receiver according to claim 14, wherein the respective first clock signal of a first slice of the plurality of slices is separated from the respective first clock signal of a second slice of the plurality of slices by a predetermined phase difference, the second slice being adjacent the first slice.

20. The receiver according to claim 14, further comprising an optical front-end configured to receive an optical signal and convert the optical signal to a voltage signal, wherein the analog signal corresponds to the voltage signal.

* * * * *